(12) United States Patent
Ophir et al.

(10) Patent No.: US 11,398,078 B2
(45) Date of Patent: Jul. 26, 2022

(54) GRADUAL TRANSITIONING BETWEEN TWO-DIMENSIONAL AND THREE-DIMENSIONAL AUGMENTED REALITY IMAGES

(71) Applicant: Elbit Systems Ltd., Haifa (IL)

(72) Inventors: Yoav Ophir, Haifa (IL); Itamar Nocham, Haifa (IL)

(73) Assignee: ELBIT SYSTEMS LTD.

( * ) Notice: Subject to any disclaimer, the term of this patent is extended or adjusted under 35 U.S.C. 154(b) by 26 days.

(21) Appl. No.: 16/492,468

(22) PCT Filed: Mar. 6, 2018

(86) PCT No.: PCT/IL2018/050252
§ 371 (c)(1),
(2) Date: Sep. 9, 2019

(87) PCT Pub. No.: WO2018/167771
PCT Pub. Date: Sep. 20, 2018

(65) Prior Publication Data
US 2021/0019942 A1    Jan. 21, 2021

(30) Foreign Application Priority Data
Mar. 15, 2017  (IL) .......................................... 251189

(51) Int. Cl.
*G06T 19/00* (2011.01)
*G02B 27/01* (2006.01)
*G06V 20/20* (2022.01)

(52) U.S. Cl.
CPC .......... *G06T 19/006* (2013.01); *G02B 27/017* (2013.01); *G06T 19/003* (2013.01); *G06V 20/20* (2022.01); *G02B 2027/0178* (2013.01)

(58) Field of Classification Search
None
See application file for complete search history.

(56) References Cited

U.S. PATENT DOCUMENTS 10,482,662 B2 * 11/2019 Anderson ............. G06T 19/006
2006/0247850 A1    11/2006 Cera et al.
(Continued)

FOREIGN PATENT DOCUMENTS

| EP | 2194508 A1 | 6/2010 |
| WO | 2015081313 A2 | 6/2015 |
| WO | 2016106358 A1 | 6/2016 |

OTHER PUBLICATIONS

International Search Report for corresponding PCT Application No. PCT/IL2018/050252 dated Jun. 5, 2018.
(Continued)

*Primary Examiner* — Hilina K Demeter
(74) *Attorney, Agent, or Firm* — Wood, Phillips, Katz, Clark & Mortimer

(57) ABSTRACT

System and method for enhancing situational awareness. A moveable see-through display viewable by a user displays an augmented reality 2D image of an external scene based on received 2D image data, in accordance with updated position and orientation of display. The see-through display further displays an augmented reality 3D image of the external scene based on received 3D image data, the 3D image overlaid conformally onto view of external scene, in accordance with updated position and orientation of display. The see-through display further selectively displays: a gradual transition of the 2D image into the 3D image, or a gradual transition of the 3D image into the 2D image. At least one image feature may gradually appear or gradually disappear during the gradual transition. The 2D or 3D image may include a region of interest based on updated position and orientation of display or selected by user.

19 Claims, 5 Drawing Sheets

(56) References Cited

U.S. PATENT DOCUMENTS

| | | |
|---|---|---|
| 2007/0132756 A1 | 6/2007 | Plocher et al. |
| 2010/0225644 A1 | 9/2010 | Navteq |
| 2011/0052042 A1 | 5/2011 | Tzvi |
| 2011/0193863 A1 | 8/2011 | Gremse et al. |
| 2012/0058801 A1* | 3/2012 | Nurmi .................. G06F 3/011 |
| | | 455/566 |
| 2013/0050258 A1* | 2/2013 | Liu ...................... G06F 3/013 |
| | | 345/633 |
| 2013/0326407 A1* | 12/2013 | van Os ............. G01C 21/3626 |
| | | 715/810 |
| 2014/0071119 A1* | 3/2014 | Piemonte ............ G06F 3/0488 |
| | | 345/419 |
| 2014/0240313 A1* | 8/2014 | Varga .................. G06T 19/006 |
| | | 345/419 |
| 2014/0316611 A1 | 10/2014 | Abyssal |
| 2014/0362180 A1 | 12/2014 | Bickerstaff et al. |
| 2014/0365934 A1 | 12/2014 | Moore et al. |
| 2015/0070356 A1 | 3/2015 | Da Veiga et al. |
| 2015/0269785 A1* | 9/2015 | Bell ..................... G06T 15/20 |
| | | 345/427 |
| 2016/0025982 A1 | 1/2016 | Sutherland |
| 2016/0042566 A1* | 2/2016 | Mao .................... A63F 13/211 |
| | | 463/31 |

OTHER PUBLICATIONS

ILPO Search Report for corresponding Israel Application No. 251189.

Office Action for corresponding Israel Application No. 251189 dated Aug. 21, 2017.

EP Supplemental Search Report for corresponding European Application No. EP 18 76 6684 dated Apr. 6, 2020.

Narzi, Wolfgang, et al. A new visualization concept for navigation systems. In: ERCIM Workshop on User Interfaces for All. Springer, Berlin, Heidelberg, 2004. p. 440-451.

* cited by examiner

GRADUAL TRANSITIONING BETWEEN TWO-DIMENSIONAL AND THREE-DIMENSIONAL AUGMENTED REALITY IMAGES

CROSS-REFERENCE TO RELATED APPLICATIONS

This application is a National Phase application filed under 35 U.S.C. § 371 of PCT International Application No. PCT/IL2018/050252 with an International Filing Date of Mar. 6, 2018, which claims priority to Israel Patent Application No. 251189, filed on Mar. 15, 2017, the entire contents of which are incorporated herein by reference.

FIELD OF THE INVENTION

The present invention generally relates to see-through displays, synthetic vision systems, digital maps, and three-dimensional visualization.

BACKGROUND OF THE INVENTION

A synthetic vision system (SVS) is a form of mediated reality that displays a synthetic image of the external environment in order to provide the viewer with an improved understanding of his/her surroundings. An SVS is commonly employed in aircrafts to provide the pilot or flight crew member with a visual representation of the aircraft flight path with respect to the external environment. The synthetic imagery generally depicts environmental features, such as terrain or obstacles encountered along the flight trajectory, together with symbols or indicators representing relevant flight parameters such as: airspeed; altitude; heading; a horizon line; turn/bank/slip/skid parameters; and the like. The information may be obtained from maps and databases stored onboard the aircraft, as well as aircraft sensors and navigational systems. Synthetic vision may also be employed in non-aerial platforms, such as automobiles or other land vehicles, in order to assist driving or navigation during nighttime or poor visibility weather conditions. An SVS may also be combined with an enhanced vision system (EVS), which displays real-time images of the environment obtained from supplementary cameras or sensors, such as thermal cameras or radar detectors.

An SVS typically includes at least an image generator for generating the synthetic image, and a display for displaying the synthetic image. For example, the synthetic image may be projected onto a fixed display in the aircraft cockpit, such as a head-up display (HUD) or a head-down display (HDD). A HUD may be transparent or "see-through", enabling the pilot to view the synthetic image while maintaining a forward viewpoint of the physical environment in the background, avoiding the need to divert attention elsewhere to a separate display or instrumentation panel. The synthetic image may also be projected onto a movable display device that moves in conjunction with the head of the pilot, known as a head-mounted display (HMD), which may also provide a simultaneous see-through view of the external environment.

An SVS presents the synthetic image in a three-dimensional (3D) format so as to provide a perspective view of the environment. Other visualization systems may display two-dimensional (2D) images of the outside world, such as a 2D digital map extracted from a digital terrain model (DTM). A 2D image generally allows the viewer to easily identify different features in the image, such as representations of nearby landmarks or objects, but it may be difficult to comprehend where these features are situated in relation to the physical surroundings, as translating a two-dimensional image representation into a corresponding three-dimensional real-world object is not intuitive or straightforward. For example, the pilot may view a 2D road map of a geographic region projected onto the real-world view of the same geographic region seen from above. The 2D map provides the pilot with an understanding of the different terrain features seen on the map, but does not necessarily provide a precise indication of how exactly these features relate to the current location of the pilot, in terms of the real-time position and orientation of the aircraft. For example, a particular geographic feature viewed on the 2D map and indicated as being a point of interest (POI) may be positioned adjacent to a second feature with a similar appearance and attributes, such that it may be unclear or ambiguous which of the two features represents the indicated POI. Such confusion may occur between visually similar elements that are located relatively close together in the 2D image, such as a symbolic indication referring to a specific obstacle among multiple obstacles in the aircraft flight path. In certain situations, particularly with aircraft piloting, an indication in the displayed synthetic image may be time-sensitive or otherwise of crucial importance, where adverse consequences may result if the displayed information is incorrectly perceived or improperly comprehended by the viewer. Moreover, there may be certain geographic features of interest that are partially or entirely obstructed from view to the pilot due to the particular position and orientation of the aircraft, and thus the pilot is unaware of these obstructed features in his surroundings. For example, a POI may be positioned behind a mountain ridge. Such a POI would not be noticeable in a 3D map image (SVS) or in the real world, but would be noticeable in a 2D map image.

U.S. Pat. No. 6,229,546 to Lancaster et al, entitled: "Rapid terrain model generation with 3-D object features and user customization interface", discloses a method and system for generating a 3D world model for simulated real terrain optimized for a personal computer. Terrain and other environmental data is acquired from digital data sources and processed to construct a predetermined intermediate database format. The data is extracted and processed to create a 3D world model file in a format optimized for a particular imaging display software, such as browsers compliant with the Virtual Reality Modeling Language specification. In the formatting step, the simulated land surface is colored and textured to correspond to geographic database layers, and natural and man-made structures are made to populate the terrain skin as 3D objects.

U.S. Pat. No. 7,352,292 to Alter et al, entitled: "Real-time, three-dimensional synthetic vision display of sensor-validated terrain data", is directed to a synthetic vision system that provides a synthetic view of terrain and obstacles in the vicinity of a moving vehicle. The synthetic view is a computer rendering in 3D perspective of objects in a terrain database. The database is updated in real-time in response to data obtained by a ranging sensor. The updated database may be stored and shared with users of displays in other vehicles.

U.S. Pat. No. 7,856,370 to Katta et al, entitled: "Method and system for displaying predictions on a spatial map", discloses a method and system for making and displaying predictions on a spatial map. A data analyzer analyzes heterogeneous data having spatial components to find utilizable data, and uses machine learning and other methods to extract relationships from the utilizable data. The extracted relationships are used to make a prediction about at least one location on the spatial map, or to compare numerous locations. An interface presents the prediction on the spatial map in the form of a heat map overlying a 3D topographical map. The 3D map may be shown as an oblique or orthogonal projection, or a perspective view. The heat map may be 2D or 3D and selectively displayed depending on user preference.

U.S. Pat. No. 8,264,498 to VanDerKamp et al., entitled: "System, apparatus, and method for presenting a monochrome image of a terrain on a head-up display unit", discloses a system, apparatus and method for presenting a monochrome 3D terrain image to a pilot on a HUD. Aircraft navigation and terrain data is received, and an image data set representative of a non-wire-frame single color perspective of the terrain scene outside the aircraft is generated, as a function of terrain data and color intensity data. The color intensity data may include shading effects and/or texturing effects. The shading effects are such that changes in terrain elevation or terrain contours are indicated by varied brightness of a single color, where darker and lighter areas of the 3D terrain image correlate to greater and lesser transparencies of the HUD.

U.S. Pat. No. 8,400,330 to He et al., entitled: "System for displaying multiple overlaid images to a pilot of an aircraft during flight", is directed to the displaying of multiple images to a pilot. A sensor subsystem detects a light transmission originating outside the aircraft and generates a first signal indicative of the light transmission. A dynamic condition sensor detects a dynamic condition of the aircraft and generates a second signal indicative of the dynamic condition. A processor commands a display unit to display a first image corresponding to the first signal, and a second image, overlaid over the first image, corresponding to the second signal, and to modify the appearance of the second image to enhance the ability of the pilot to discern the first image. For example, the processor may command the display unit to blank out a portion of the second image, to render a portion of the second image partially transparent, or to diminish a brightness of a portion of the second image.

U.S. Pat. No. 8,687,056 to Yahav et al, entitled: "Aircraft landing assistance", discloses an enhanced vision system for assisting aircraft piloting. An aircraft control operator sends flight instructions associated with an object of interest to a pilot wearing a head-mounted display (HMD). A visual representation of the flight instructions with the object of interest marked is generated, respective of a combined spatial and symbolic image viewed by the pilot on the HMD. The aircraft control operator receives from the pilot confirmation of the flight instructions by designating the marked object of interest on the combined spatial and symbolic image, where the designation is performed in conjunction with the pilot line-of-sight.

U.S. Patent Application No. 2011/0052042 to Ben Tzvi, entitled: "Projecting location based elements over a heads up display", discloses a method and system for displaying location aware entities (LAEs) over a vehicle windshield while driving to provide navigation guidance. A 3D model of a scene within a specified radius of the vehicle is generated from a digital mapping source, and a position of a selected LAE contained within the scene is associated with a respective position in the 3D model. The LAE is superimposed onto a specified position on a transparent screen facing the viewer and associated with the vehicle, with a graphic indicator associated with the LAE. The specified position is calculated based on: the respective position of the LAE in the 3D model; the screen geometrical and optical properties; the viewing angle; the viewer distance from the screen; and/or the vehicle position and angle within the scene, such that the graphic indicator and LAE are substantially on a common line. The graphic indicator may be a direction arrow, which is repeatedly updated based on the vehicle position on a calculated route between the vehicle and LAE.

U.S. Patent Application No. 2014/0316611 to Da Silva, entitled: "System and method of operation for remotely operated vehicles with superimposed 3D imagery", is directed to the operation of remotely operated vehicles (ROVs) with superimposed 3D imagery and navigational information. A live video feed is acquired by a video camera of the ROV. A virtual video feed incorporating 3D elements representing objects disposed in an operation environment of the ROV is generated. The angle and position of the virtual video camera is synchronized with the angle and position of the real video camera. The virtual video feed and real video feed are superimposed, such that the transparency or opaqueness of a region of lesser interest in one video feed is manipulated to make the corresponding region of the other video feed more visible. Graphic and/or textual information may also be superimposed onto the hybrid 3D imagery.

U.S. Patent Application No. 2010/0225644 to Swope, III et al, entitled: "Method and system for transitioning between views in a traffic report", is directed to a traffic report that includes a visual depiction of a geographical area and can transition between two types of views. Data representing traffic conditions is received from various sources and is used by a traffic report application to generate a video output, such as on a web-based or cellular-based application, that depicts at least two types of geographic graphics. The traffic report moves from a first view of a virtual world to a second view of the virtual world such that both parts of the virtual world are visible for at least part of the transition. The transition may be from a 2D view to a 3D view, from a 3D view to a 2D view, or between two different 3D views. The transition may fade out elements of the first view, such as by increasing transparency of the elements, while moving to the second view. Transitioning between views may include changing the altitude, direction or orientation of a virtual camera towards the second view.

U.S. Patent Application No. 2014/0071119 to Piemonte et al, entitled: "Displaying 3D objects in a 3D map presentation", is directed to the display of building representations and other 3D object representations on a map presentation of a map application. When the map presentation is moved to display a new area, the 3D representations rise from a ground level to their full heights and transition from transparent to opaque at the same time. Areas can be brought into view by a command to pan the map or to zoom in below a threshold level. Conversely, the 3D representations may be removed by lowering the objects from their full height to ground level and fading out from opaque to transparent. The building representations may also be depicted in a 2D map presentation, in which the building are depicted as flat, but may be caused to fade and rise if the map presentation transitions to a 3D view.

SUMMARY OF THE INVENTION

In accordance with one aspect of the present invention, there is thus provided a system for enhancing the situational awareness of a user. The system includes a moveable see-through display viewable by the user, and a processor. The processor is configured to receive an updated position and orientation of the see-through display, to receive two-dimensional (2D) image data relating to an external scene, and to receive three-dimensional (3D) image data relating to the external scene. The see-through display is configured to display an augmented reality 2D image of the external scene based on the received 2D image data, in accordance with the updated position and orientation of the see-through display. The see-through display is further configured to display an augmented reality 3D image of the external scene based on the received 3D image data, the 3D image overlaid conformally onto a view of the external scene, in accordance with the updated position and orientation of the see-through display. The see-through display is further configured to selectively display a gradual transition of the 2D image into the 3D image and/or a gradual transition of the 3D image into the 2D image. The 2D image data or the 3D image data may include: map data, geographical terrain features, textural data relating to geographical terrain features, a 3D geographical model, hierarchical map information, previously captured sensor images, real-time sensor image, and/or a video image. The 2D image or the 3D image may include at least one region of interest (ROI), which may be selected based on the updated position and orientation of the display or may be selected by the user. The 3D image may depict at least one ROI obstructed by features in the external scene. The 2D image or 3D image may be a video image. At least one image feature of the 2D image or the 3D image may gradually disappear or may gradually appear during the gradual transition. The display may further display supplementary image content during the gradual transition. At least one transitioning attribute of the gradual transition may be selectively modified. The display may repeatedly update the gradual transition in accordance with the updated position and orientation of the display. The 3D image may be generated in advance based on: a radius surrounding the updated position and orientation of the display; a heading vector of the display, a selected ROI, and/or other predefined information. The system may further include a line-of-sight detector, configured to detect the position and orientation of the display. The movable display may be on a moving platform, such as an aircraft in flight. The display may be: a head-up display (HUD), a head-mounted display (HMD), a wearable display device, and/or a display screen of a computing device.

In accordance with another aspect of the present invention, there is thus provided a method for enhancing the situational awareness of a user. The method includes the procedures of: receiving an updated position and orientation of a movable see-through display viewable by the user, receiving 2D image data relating to an external scene, and receiving 3D image data relating to the external scene. The method further includes the procedures of: displaying on the see-through display an augmented reality 2D image of the external scene based on the received 2D image data, in accordance with the updated position and orientation of the see-through display; and displaying on the see-through display an augmented reality 3D image of the external scene based on the received 3D image data, the 3D image overlaid conformally onto a view of the external scene, in accordance with the updated position and orientation of the see-through display. The method further includes the procedure of selectively displaying on the see-through display a gradual transition of the 2D image into the 3D image and/or a gradual transition of the 3D image into the 2D image. The 2D image or the 3D image may include at least one ROI, which may be selected based on the updated position and orientation of the display or may be selected by the user. The 3D image may depict at least one ROI obstructed by features in the external scene. The 2D image or 3D image may be a video image. At least one image feature of the 2D image or the 3D image may gradually disappear or may gradually appear during the gradual transition. At least one transitioning attribute of the gradual transition may be selectively modified. The gradual transition may be repeatedly updated in accordance with the updated position and orientation of the display. The 3D image may be generated in advance based on: a radius surrounding the updated position and orientation of the display; a heading vector of the display, a selected ROI, and/or other predefined information.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a system and method for enhancing the situational awareness of a user viewing a movable see-through display, by selectively displaying a gradual transition of a two-dimensional (2D) augmented reality image of the external scene into a three-dimensional (3D) augmented reality image of the external scene. The transition may also be reversed such that a 3D augmented reality image of the scene presented on the movable see-through display is modified gradually into a 2D augmented image of the scene. The gradual transitioning allows the viewer to visually track image features, such as regions of interest in the scene, transitioning between the 2D image and 3D image formats. In this manner, the viewer may intuitively perceive the depicted image features in relation to the real-world environment.

Figure 1:
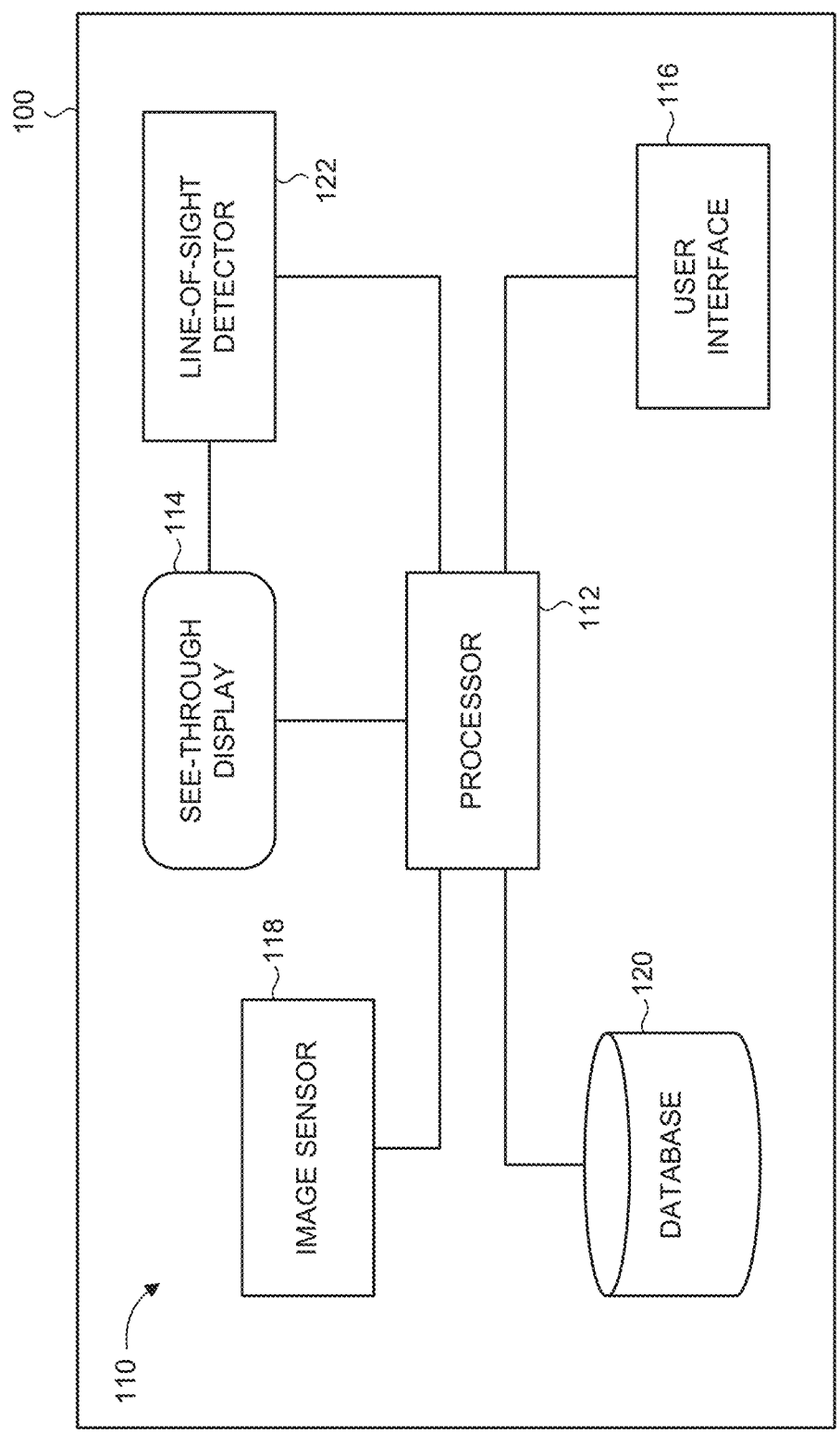
FIG. 1 is a schematic illustration of a system for enhancing the situational awareness of a user, constructed and operative in accordance with an embodiment of the present invention.

Reference is now made to FIG. 1, which is a schematic illustration of a system, generally referenced 110, for enhancing the situational awareness of a user, constructed and operative in accordance with an embodiment of the present invention. System 110 includes a processor 112, a see-through display 114, a user interface 116, an image sensor 118, a database 120, and a line-of-sight (LOS) detector 122. Processor 112 is communicatively coupled with display 114, with user interface 116, with image sensor 118, with database 120, and with LOS detector 122. System 110 is generally installed on a platform, referenced 100, although some components may reside at a different location and may be accessible to processor 112 through a wireless communication link. For example, system 110 may be implemented (at least partially) on an aircraft, an automobile, a motorcycle, a ship or marine vessel, or other types of moving platforms. Alternatively, system 110 may be installed (at least partially) on a stationary platform, in which case see-through display 114 is a movable display, such as a head-mounted display (HMD) that moves in accordance with the head movements of the user. The term "user" herein refers to any person or group of persons operating the system or method of the present invention. For example, the user may be an aircraft pilot or automobile driver, where the system is installed (at least partially) in the cockpit of an aircraft or automobile with a viewable see-through display. For another example, the user may be a pedestrian and the system may be integrated with a wearable see-through display worn by the user.

Display 114 displays an image, such as a 2D image or a 3D image, generated or obtained by processor 112. Display 114 is a transparent or "see-through" display device, such that the user can simultaneously observe the displayed image overlaid in the foreground onto a background view of the external environment viewable through the display. Display 114 is also a movable display, either a moving display on a fixed (stationary) platform, and/or a fixed (or moving display) on a moving platform. For example, display 114 may be embodied by a fixed display, such as a head-up display (HUD) or a head-down display (HDD) integrated in a vehicle platform 100. Alternatively, display 114 may be a head-mounted display (HMD) embedded within a wearable apparatus worn by the user, or a portable or hand-held display, such as a display screen of a mobile computing device. Display 114 may include a projector configured to project an image onto a display screen viewable by the user.

User interface 116 allows the user to control various parameters or settings associated with the components of system 110. For example, user interface 116 can allow the user to provide instructions or select parameters associated with the displayed image. User interface 116 may include a cursor or touch-screen menu interface, such as a graphical user interface, configured to enable manual input of instructions or data. User interface 116 may also include communication devices configured to provide voice communication, such as a microphone and an audio speaker, as well as voice recognition capabilities to enable entering instructions or data by means of speech commands. User interface 116 may also enable the user to communicate with external sources, such as with a remote supervisor.

Image sensor 118 captures images of a scene in a real-world environment. Image sensor 118 may be any type of sensor device capable of acquiring an image representation of the scene, including the acquisition of any form of electromagnetic radiation at any range of wavelengths (including visible and non-visible wavelengths). For example, image sensor 118 may be a forward looking infrared (FLIR) camera or a charge-coupled device (CCD) camera. Image sensor 118 may be mounted on platform 100, and may be aligned toward the general direction in which the user is facing, so as to image a scene in the field of view (FOV) of the user. Image sensor 118 is operative to acquire at least one image frame, such as a sequence of consecutive image frames representing a video image, which may be converted into an electronic signal for subsequent processing and/or transmission.

Database 120 stores information relating to real-world environments, such as an environment in which system 110 is expected to be located. The environmental information may include a 3D geographic model that includes a three-dimensional representation of the Earth or of a particular area, region or territory of interest. The 3D geographic model may include image and texture data relating to geographical features, including artificial features (e.g., buildings or monuments), such as the location coordinates of such features and different views thereof (e.g., acquired via satellite imagery or aerial photography, and/or street level cameras). The 3D model may also provide multiple visual representations of the geographical terrain of a region of interest at different positions and viewing angles. Database 120 may include a digital elevation map, weather or climate forecasts, and driving routes or flight routes of platform 100. Database 120 may also include previously captured images and/or image data that allows for the reconstruction of synthetic images of the relevant scene. Database 120 may also store supplementary image content associated with different landmarks or geographic locations, such as in the form of symbols, text, or other graphics, to be selectively displayed with relevant images. Database 120 may be located externally to platform 100 but communicatively coupled with system 110, such that database 120 may transmit images to system 110 while platform 100 is in motion.

LOS detector 122 provides an indication of the position and orientation of display 114. LOS detector 122 may include one or more devices or instruments configured to measure the position and the orientation or viewing angle of display 114 with respect to a reference coordinate system, such as: a global positioning system (GPS); a compass; an inertial navigation system (INS); an inertial measurement unit (IMU); motion sensors or rotational sensors (e.g., accelerometers, gyroscopes, magnetometers); a rangefinder; and the like. LOS detector 122 may utilize the location of platform 100 on which display 114 is situated when calculating the position and orientation of display 114. LOS detector 122 may further utilize a driving route or flight route of platform 100 (e.g., using a GPS or other onboard instruments), as well as other relevant real-time parameters of platform 100, such as velocity and acceleration, to allow the determination of an updated location over time. If display 114 is embodied by a head-mounted display (HMD), LOS detector 122 may include a head tracking device configured to determine the real-time head direction of the user, and/or an eye tracking device configured to determine the real-time eye gaze direction of the user.

Processor 112 receives instructions and data from the components of system 110. Processor 112 performs necessary image processing and directs the projection of an augmented reality image on see-through display 114, as will be discussed further hereinbelow. The components and devices of system 110 may be based in hardware, software, or combinations thereof. It is appreciated that the functionality associated with each of the devices or components of system 110 may be distributed among multiple devices or components, which may reside at a single location or at multiple locations. For example, the functionality associated with processor 112 may be distributed between multiple processing units (such as a dedicated image processor for the image processing functions). Processor 112 may be part of a server or a remote computer system accessible over a communications medium or network, or may be integrated with other components of system 110, such as incorporated with a computer associated with display 114. System 110 may optionally include and/or be associated with additional components not shown in FIG. 1, for enabling the implementation of the disclosed subject matter. For example, system 110 may include a power supply (not shown) for providing power to various components, and may further include a memory or storage unit (not shown) for temporary storage of images or other data.

The term "image" as used herein may refer to a video image or a plurality of image frames presented in sequence. In accordance with an embodiment of the present invention, a video image may be displayed in real-time and continuously updated to reflect the actual environment respective of the current location and heading of a moving platform 100.

The term "repeatedly" as used herein should be broadly construed to include any one or more of: "continuously", "periodic repetition" and "non-periodic repetition", where periodic repetition is characterized by constant length intervals between repetitions and non-periodic repetition is characterized by variable length intervals between repetitions.

The term "region of interest (ROI)" as used herein may refer to one or more points, features or areas, of any size, shape, or configuration, in an external scene, including a collection of points that represent a unified physical object or entity located in the scene (i.e., an "object of interest"), or that represent a general environmental feature or group of features (and not necessarily a unified object), and including points or features that are dynamic (e.g., in motion relative to the user or system).

The operation of system 110 will now be described in general terms, followed by specific examples. Processor 112 receives an indication of the current position and orientation of display 114 from LOS detector 122. The position and orientation of display 114 represents a viewpoint of an external scene viewed by the user though the display 114. Processor 112 further receives 2D image data and 3D image data of the external scene. For example, processor 112 may receive real-time images of the scene captured by image sensor 118, or may obtain from database 120 previously captured images or environmental information from which images of the scene may be generated. Processor 112 generates (or receives) a 2D image based on the 2D image data of the external scene and the position and orientation of display 114. The generated 2D image may be a 2D map of the external scene. The 2D image may reflect a designated location, such as the geographic area in a selected vicinity of platform 100 (e.g., a 10 km radius surrounding the current location of platform 100). The 2D image may be continuously updated in accordance with the changing position and orientation of display 114, to reflect the changing external scene viewed though display 114 or to reflect an updated geographic location of platform 100.

Processor 112 further generates (or receives) a 3D image of the external scene based on the 3D image data (e.g., from real-time images captured by sensor 118, or from a 3D geographic model or other information stored in database 120) and based on the position and orientation of display 114. The 3D image may represent a map image depicting the external scene viewed along the line-of-sight of display 114. In other words, the 3D image depicts the scene from the perspective of a LOS vector calculated based on the position and orientation of display 114. For example, if display 114 is an HMD, the LOS vector may correspond to the line-of-sight of the user (e.g., represented by the head direction and/or eye direction of the user). The sightline of display 114 may represent any direction with respect to platform 100, including a forward-facing view, a rear-facing view, or a side-facing view (i.e., in relation to the direction of motion of platform 100 and/or display 114). The scene represented by the 3D image at least partially overlaps the scene represented by the 2D image, such that there are at least some common image features in both images. The 3D image may be continuously updated in accordance with the changing position and orientation of display 114, to reflect the changing perspective of the external scene. Processor 112 may also generate the 3D image in advance based on relevant information, such as based on the location and movement trajectory of platform 100 or a region of interest. For example, processor 112 may (e.g., repeatedly) obtain the geographic coordinates of platform 100, as well as the heading, velocity, acceleration, travelling route, and other motion parameters (e.g., using a GPS or INS), determine a future external scene (as viewed along the line-of-sight of display 114) corresponding to an expected future location of platform 100, and then retrieve or generate a 3D image reflecting the determined future scene.

Display 114 selectively displays the 2D image or the 3D image as an augmented reality image viewable by the user. The 3D image is displayed overlaid onto the view of the external scene conforming to the viewpoint of the user in accordance with the line-of-sight of display 114. The displayed images may include an indication of at least one region of interest (ROI) in the scene. For example, the user may select and indicate an ROI in the scene, which may be tracked by processor 112 and depicted in the displayed 2D image or 3D image, such as with a visual marking or symbol. In another example, processor 112 may automatically determine an ROI to be displayed, such as in accordance with the location of platform 100 or a designated location (e.g., a specified radius around platform 100).

The displayed image is adaptively modified on display 114 to gradually transition from the 2D image into the 3D image, or vice-versa. A "gradual transition" of displayed images may be considered one in which at least one intermediate image is displayed in between the initial image and the final image, where the intermediate image(s) includes (changing or distorted) features or information of the initial and/or final image. For example, a gradual transition from a 2D image into a 3D image may include one or more intermediate images (or "image frames") depicting image features of the initial 2D image in a transitionary state (e.g., having a different size, shape, position, or other visual attributes) as the two-dimensional representation of the external scene is gradually altered into a three-dimensional form. The transition rate, or time required to transition between the 2D image and 3D image, may vary and may be modified. In general, display 114 gradually transitions between the images in a manner that allows for the visual tracking of transitioning image features. Accordingly, the gradual transitioning display provides an intuitive understanding of different scene features depicted in the images in relation to the physical surroundings of the user. For example, the user may not clearly comprehend the precise location in the physical environment of a particular landmark depicted on a 2D map image. However, as display 114 gradually transitions from displaying the 2D map image depicting the marked landmark to displaying a 3D map image depicting the marked landmark, while ensuring the updated image reflects the changing external scene viewed though display 114, then the enhanced 3D perspective can enable the user to visualize and understand the location of the indicated landmark in relation to the physical environment. The user may also be able to identify a geographic feature that is not visible in a 3D map image, such as due to a physical obstruction that serves to obstruct the feature, as the 3D map image gradually transitions into a corresponding 2D map image in which the same feature is no longer obstructed. Display 114 may also depict supplementary information associated with a ROI in the scene, such as a text describing instructions or details associated with a particular terrain feature, or to indicate objects obstructed from view. The user may provide instructions to manipulate the displayed images or modify display settings, such as to provide a cross-sectional view through a selected portion of the displayed 2D or 3D image or to change the viewing angle or magnification level of the displayed image.

Figure 2B:
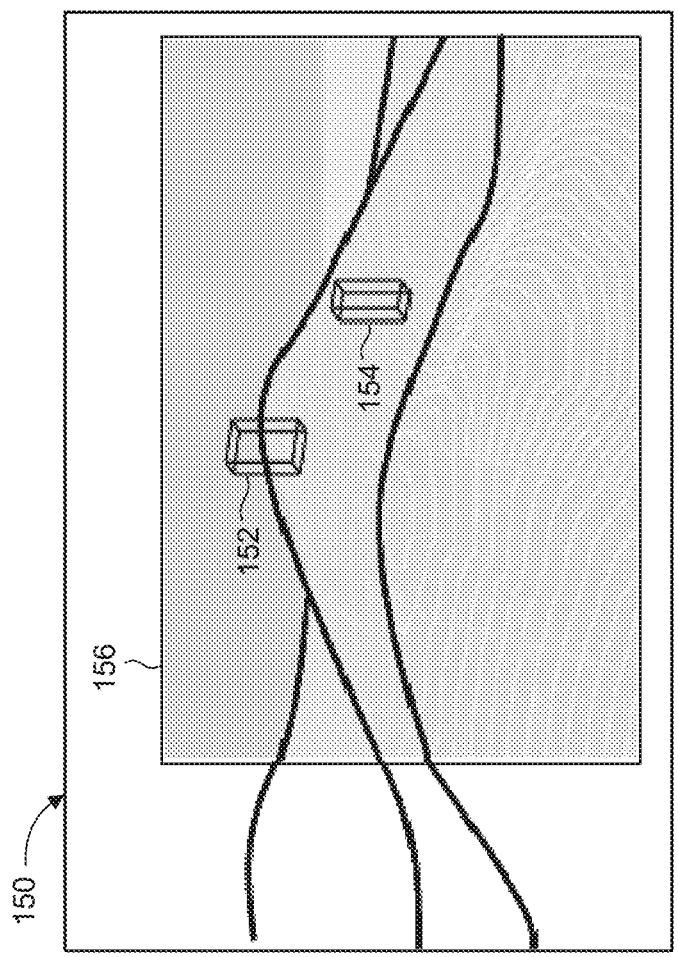
FIG. 2B is an illustrative view of an exemplary displayed three-dimensional (3D) map image with indicated regions of interest corresponding to the 2D map image of FIG. 2A, operative in accordance with an embodiment of the present invention.
Figure 2A:
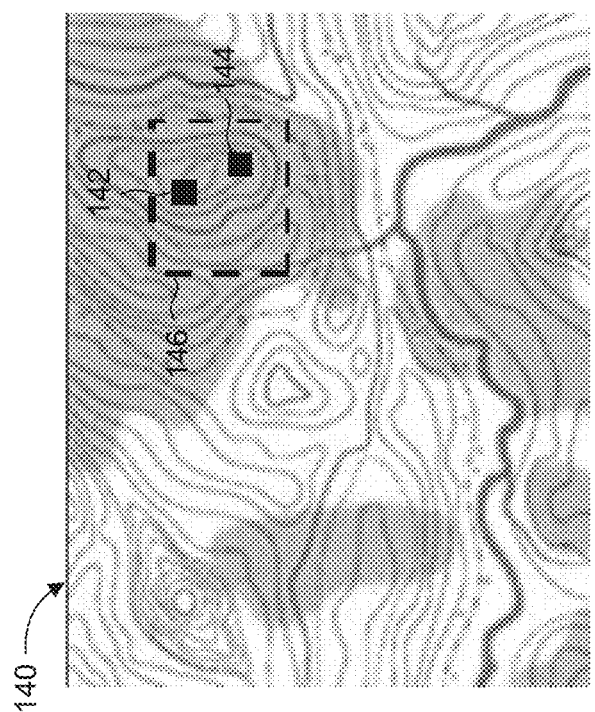
FIG. 2A is an illustrative view of an exemplary displayed two-dimensional (2D) map image with indicated regions of interest, operative in accordance with an embodiment of the present invention.

Reference is now made to FIG. 2A, which is an illustrative view of an exemplary displayed 2D map image, generally referenced 140, with indicated regions of interest, operative in accordance with an embodiment of the present invention. 2D map image 140 represents a map image depicting an external environment, such as along the flight path of an aircraft. 2D map image 140 includes indications of two buildings, referenced 142 and 144, located within a region of interest (ROI) referenced 146. By viewing 2D map image 140, the user may observe various environmental features around the current location, including buildings 142, 144 and ROI 146, but may be unable to accurately relate the depicted image features to the corresponding real-world features. For example, as buildings 142, 144 are situated relatively close to one another, it may be difficult to accurately differentiate between them when examined in the physical environment, particularly if buildings 142, 144 have similar visual attributes.

At a certain stage, 2D map image 140 begins gradually transitioning into a corresponding 3D map image on display 114. The displayed transitioning images may be repeatedly updated to reflect a changing perspective of the scene in accordance with changes in the position and orientation of display 114. The transitioning from 2D to 3D may occur upon instructions from the user, or may occur automatically when certain conditions are met, such as if the attributes of the 2D image and/or indicated ROIs are such that a 3D image would be considered to enhance situational awareness. Reference is now made to FIG. 2B, which is an illustrative view of an exemplary displayed 3D map image, generally referenced 150, with indicated regions of interest, corresponding to the 2D map image of FIG. 2A, operative in accordance with an embodiment of the present invention. Display 114 presents 3D map image 150 representing a 3D perspective image of the external environment as viewed along the line-of-sight of display 114. 3D map image 150 also includes indications of two buildings, referenced 152, 154, corresponding to the respective buildings 142, 144 indicated in 2D image 140, as well as an ROI 156 corresponding to ROI 146 indicated in 2D image 140. As the user perceives 2D map image 140 gradually forming into 3D map image 150 on display 114, the user obtains a perspective view of the external environment that facilitates and enhances user comprehension of the depicted environmental features in relation to the physical surroundings. In particular, the user can track (two-dimensional) buildings 142, 144 gradually transitioning into (three-dimensional) buildings 152, 154, respectively, and thereby distinctly identify the actual corresponding buildings in the external environment. For example, if processor 112 provides instructions or information relating to an ROI 146 displayed on the 2D map image 140, the instructions or information may be clearly and accurately understood by the user when viewing the indication of ROI 146 on 2D map image 140 transitioning into the indication of ROI 156 on 3D map image 150. The perspective three-dimensional visualization of ROI 156 in relation to the physical environment around platform 100 serves to facilitate perception of ROI 156 and the understanding of the instructions relating to ROI 156, thus enhancing overall situational awareness. 3D map image 150 may subsequently transition back into 2D map image 140 on display 114, such as automatically or upon manual instructions.

An ROI displayed on a 2D image may not be visible when viewed on the corresponding 3D image, such as if the region or object is obstructed from view in the 3D image (from the viewpoint of the LOS of display 114). For example, an ROI may be positioned behind a mountain or tree or otherwise blocked by some topographical or terrain feature, or cannot be seen due to atmospheric or weather conditions such as smoke or fog. The obstructed ROI may also not be visible in the actual physical environment, such as when viewed through a HUD. In such a case, the obstructed ROI may appear and be indicated on the 2D image but would gradually vanish as the 2D image gradually transitions into a 3D image, until eventually disappearing entirely. Therefore, if a particular ROI is obstructed or not visible in a 3D image (or in a view of the external scene viewed through display 114), the 3D image may be transitioned into a corresponding 2D image, upon manual instructions or upon an automatic determination. For example, if the user sees a particular object in an initial 2D image and then notices that the object is no longer visible after then 2D image transitioned into a 3D image, then the user may provide instructions to transition back to the 2D image so as to restore the view of the obstructed object. Optionally, a displayed 2D image may include an indication that a particular ROI would potentially be obstructed when viewed in a corresponding 3D image. For example, a potential 3D obstruction of a 2D image ROI may be indicated by marking the ROI with a graphical variation with respect to the other regions depicted in the scene, such as by displaying the ROI marking with a different color and/or different contour line. Correspondingly, an obstructed ROI may also be depicted symbolically in a 3D image, such as by displaying a dashed outline or highlighted shape superimposed onto another region of the scene, indicating that the obstructed ROI is effectively located "behind" the marked scene region (when viewed along the LOS of display 114).

Figure 3:
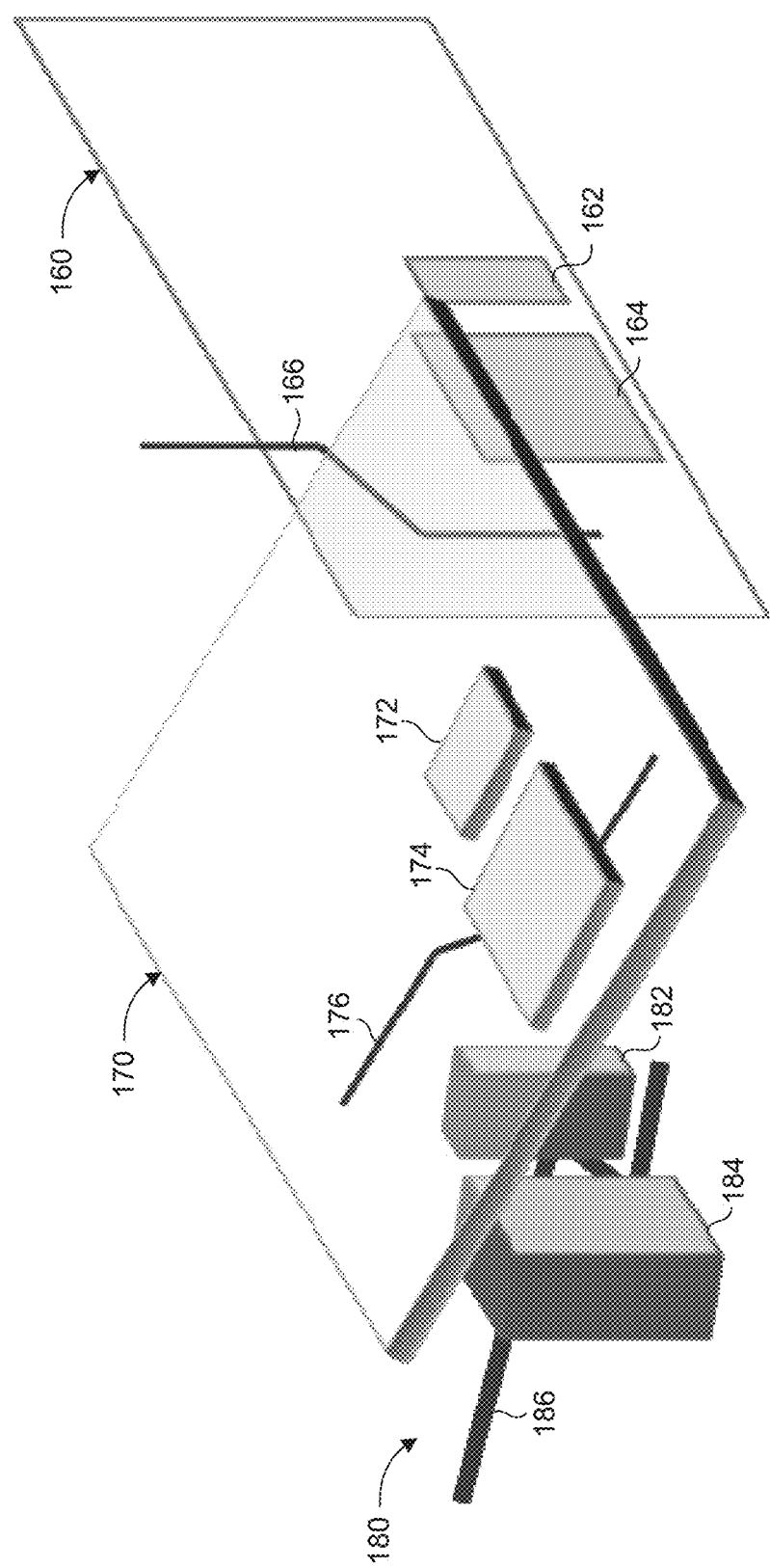
FIG. 3 is a schematic illustration of an exemplary 2D image gradually transitioning into a 3D image, operative in accordance with an embodiment of the present invention.

Reference is made to FIG. 3, which is a schematic illustration of an exemplary 2D image, generally referenced 160, gradually transitioning into a 3D image, generally referenced 180, operative in accordance with an embodiment of the present invention. 2D image 160 depicts a scene that includes at least three scene features, referenced 162, 164 and 166, respectively. Scene features 162, 164, 166 appear as 2D objects on 2D image 160. As 2D image 160 gradually transitions into a corresponding 3D image 180, the scene features 162, 164, 166, gradually appear as 3D objects, referenced 182, 184 and 188, respectively, as viewed from a particular LOS associated with the display. The viewer can thus visualize the 2D scene features 162, 164, 166 as 3D objects 182, 184 and 188 with depth perspective and better perceive the characteristics of these objects in relation to the imaged scene, such as their three-dimensional shape, size and relative locations. Transitional image 170 represents an intermediate stage in the gradual transitioning between 2D image 160 and 3D image 180 (or vice-versa). The scene features 162, 164, 166 of 2D image 160 gradually attain a three-dimensional appearance, which is depicted as an intermediate stage in image 170 as corresponding image features 172, 174 and 176, which may be considered a partial-2D and/or partial-3D phase. The gradual transitioning from 2D image 160 to 3D image 180, or conversely from 3D image 180 to 2D image 160, serves to provide the viewer with an intuitive perception of the depicted scene features in relation to the actual physical environment, while maintaining such intuitive perception throughout the transitioning process.

Different parameters associated with the displayed 2D image or 3D image, and/or the gradual transitioning between the 2D image and 3D image, may be selectively modified. The display parameters may be selected manually via instructions provided by the user, or automatically, such as via preconfigured settings. The user may provide default parameters during an initialization process of system 110, may manually select display parameters in real-time, and/or may define conditions for altering or adjusting the display parameters automatically. For example, the rate at which the 2D image transitions into the 3D image, or vice-versa, may be adjusted or modified, such as by increasing the transition rate to provide a "quicker" or shorter duration transition (e.g., by decreasing the number of intermediate image frames displayed between the initial and final images), or alternatively by decreasing the transition rate to provide a "slower" or longer duration transition (e.g., by increasing the number of intermediate image frames displayed between the initial and final images). The intermediate image frames may also be displayed recursively or repeated indefinitely in order (i.e., displayed in a "loop"). Other parameters that may be manipulated may include: the display orientation of the image; the magnification or scaling factor at which the image is displayed; the content of the image, such as selecting at least one ROI to be depicted or not depicted in the image; color or brightness parameters or other visual attributes of the image; and the like. The user may also selectively control the degree of three-dimensional visualization of the displayed images, by increasing or decreasing the level of conformity of the 3D image overlaid onto the view of display 114.

Image features may remain consistent or may change during the gradual transitioning between the 2D image and 3D image. For example, certain features or objects depicted in the 2D image may gradually disappear as the 2D image gradually transitions into a 3D image, until eventually only the borderlines or contours of those features or objects appear visible. For another example, supplementary image content, such as a text or symbol, present in the 2D image may gradually appear elevated over the image as it is gradually transitioning into a 3D image. Additionally, supplementary content that is not present in an initial 2D image or 3D image may optionally appear during the gradual transitioning, and conversely, existing supplementary content may gradually disappear during the gradual transitioning.

According to an example implementation of system 110, a driver of a vehicle is navigating toward an intended destination. Display 114 displays a 2D image of a road map depicting streets and traffic intersections along the driving route of the vehicle, in accordance with the updated position and orientation of the vehicle. The driver may receive instructions (e.g., via a navigation assistance application) to turn right at a particular intersection onto a particular street, such as by a verbal cue stating: "in another 500 meters, turn right". The driver may not clearly comprehend the instructions, since there may be multiple adjacent intersections near the indicated area, and thus may not recognize precisely at which intersection the instructions are referring to. Even if the particular intersection or street is marked on the 2D image of the road map, the driver may not understand which of the multiple adjacent intersections or streets it is intended to represent in the real-world. Accordingly, display 114 displays the 2D image road map gradually transitioning into a 3D image showing the external environment at the updated position and orientation of the vehicle as viewed from the LOS of the see-through display 114 viewed by the driver. In this manner, the driver can track the marked intersection (representing the "turning instructions") on the 2D image gradually changing into a three-dimensional perspective view of the intersection on the 3D image, such that the driver can identify the intersection in the real-world and is aware of where exactly he needs to implement the turn. For example, the driver may view the transitioning images on a see-through display integrated with the vehicle windshield, or on a display screen of a smartphone or other portable computing device, in conjunction with the navigation assistance application.

Figure 4:
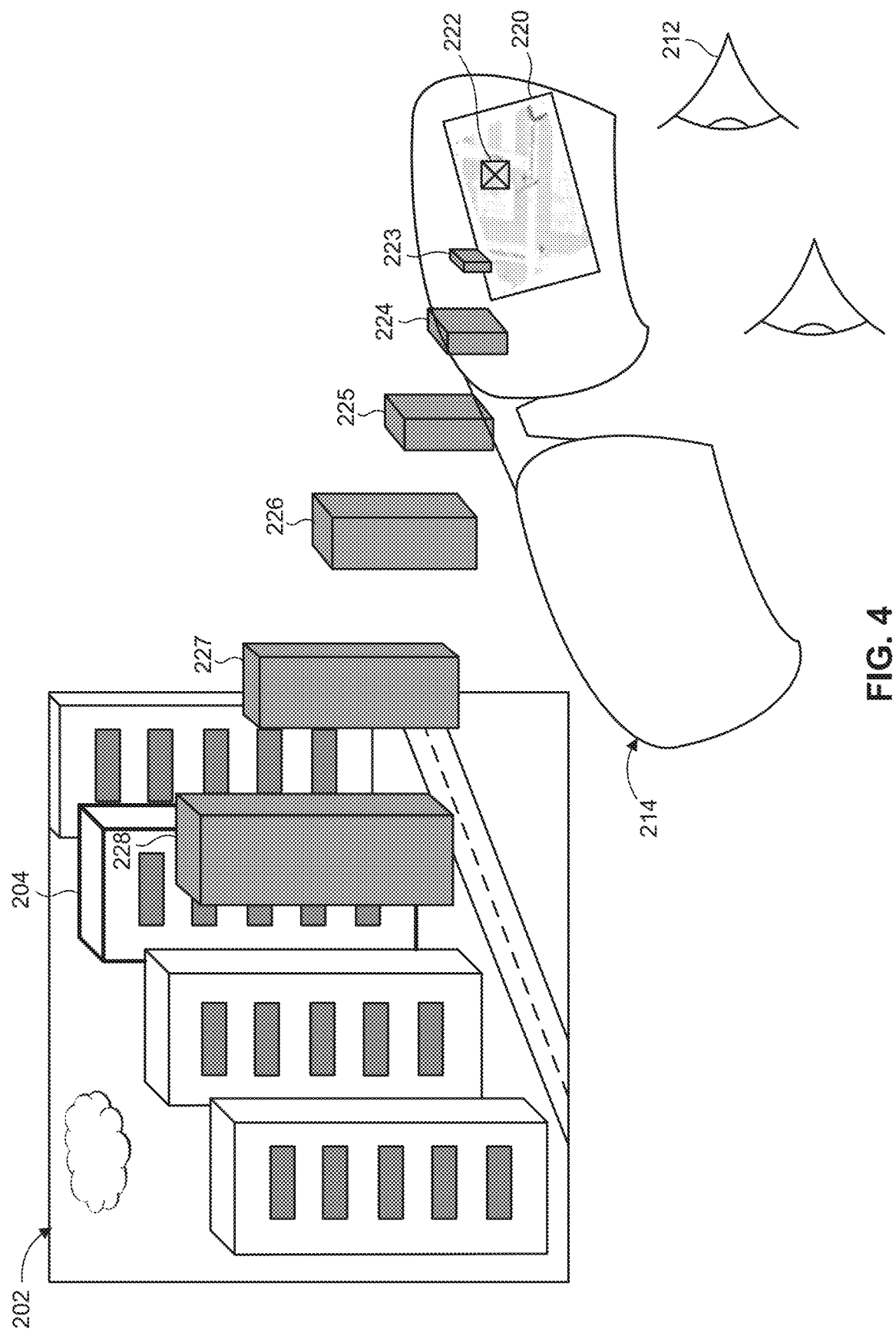
FIG. 4 is a schematic illustration of a viewer observing a 2D image with an indicated region of interest (ROI) gradually transitioning into a 3D indication of the ROI displayed conformally onto a view of a real-world scene, operative in accordance with an embodiment of the present invention.

Reference is now made to FIG. 4, which is a schematic illustration of a viewer observing a 2D image with an indicated ROI gradually transitioning into a 3D indication of the ROI displayed conformally onto a view of a real-world scene, operative in accordance with an embodiment of the present invention. A user, represented by eyes 212, views a real-world scene, referenced 202, through a see-through display, represented by visor 214. Scene 202 includes a number of similar buildings located next to one another on the side of a road. The user also views a 2D image of a road map, referenced 220, displayed on a portion of visor 214. 2D map image 220 depicts a building of interest marked with an indication symbol 222. As scene 202 includes multiple adjacent buildings with a similar appearance, the user may not recognize which of the real-world buildings is actually represented by symbol 222 on 2D image 220. The user then views the 2D indication symbol 222 gradually transitioning into a 3D indication symbol 228 overlaid conformally onto the relevant building 204 of scene 202 as viewed through the visor display 214. For example, the user views a plurality of intermediate image frames, represented by intermediate symbols 223, 224, 225, 226 and 227, displayed temporally between 2D indication symbol 222 and 3D indication symbol 228. The attributes of the displayed transitioning or intermediate images may be dynamically selected, such as: the transition resolution or number of intermediate frames, the frame rate, the frame duration, whether to display in a loop (recursively), and the like. By visualizing 2D symbol 222 on 2D image 220 gradually transitioning into a 3D symbol 228 overlaid onto the view of scene 202, the user clearly recognizes that building 204 represents the indicated building of interest, and can distinctly identify the relevant building 204 in relation to other (similar) buildings in the real-world environment. It is noted that an indication of an ROI may relate to a very precise aspect or subsection of the designated region or object, such as a specific floor or even a specific room of a building of interest, where the degree of potential ambiguity is even greater, in which case the gradually transitioning intermediate images (or intermediate indication symbols) may enable the user to accurately perceive even such precise aspects of the designated region or object.

Figure 5:
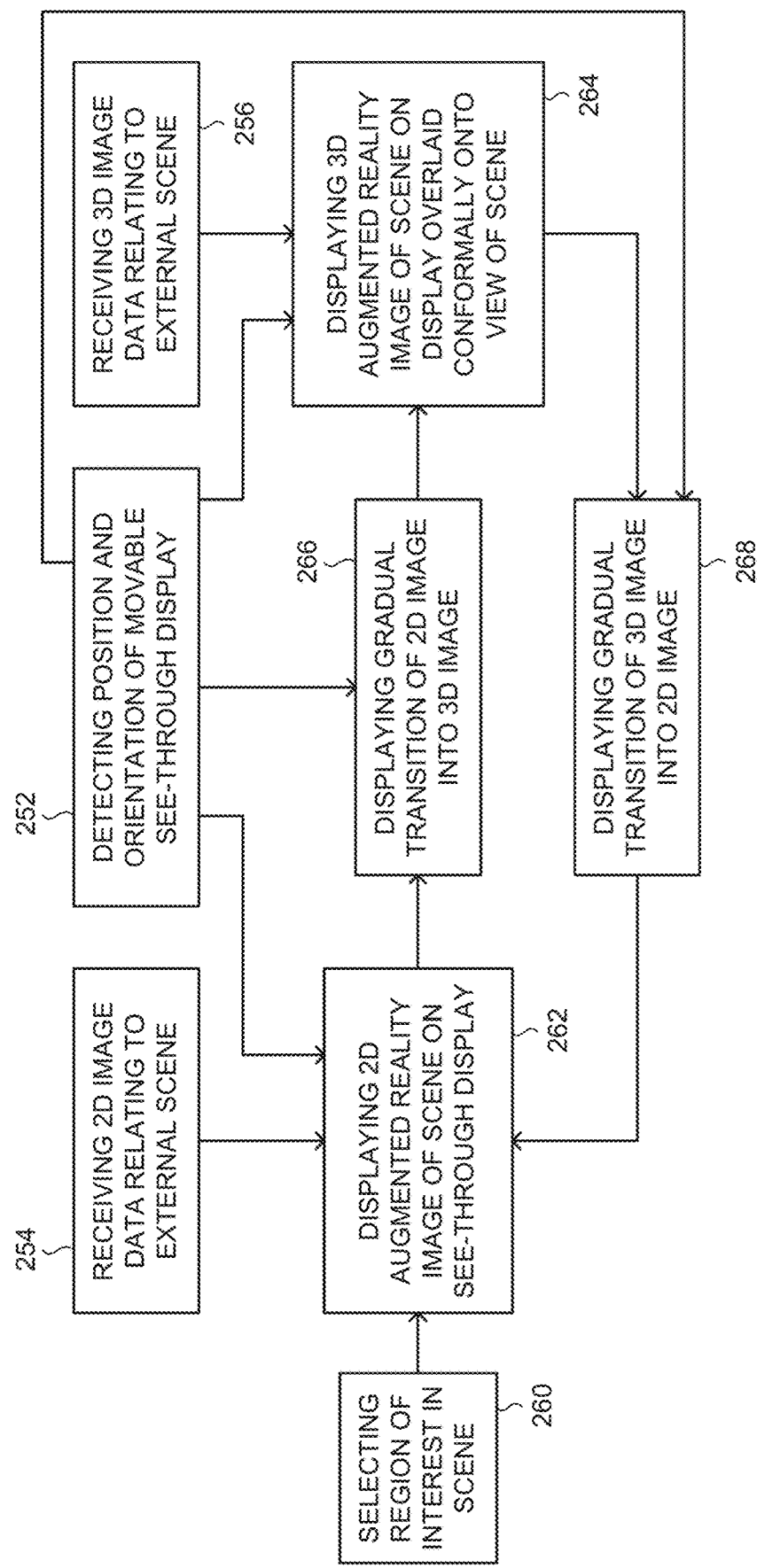
FIG. 5 is a block diagram of a method for enhancing the situational awareness of a user, operative in accordance with an embodiment of the present invention.

Reference is now made to FIG. 5, which is a block diagram of a method for enhancing the situational awareness of a user, operative in accordance with an embodiment of the present invention. In procedure 252, the position and orientation of a movable see-through display is detected. Referring to FIG. 1, the position and orientation of display 114 is detected by LOS detector 122 and provided to processor 112. The position and orientation of display 114 represents a viewpoint of an external scene viewed though display 114.

In procedure 254, 2D image data relating to an external scene is received. Referring to FIG. 1, processor 112 receives 2D image data of an external scene, such as real-time images of the scene (e.g., obtained from image sensor 118), and/or previously captured images and/or environmental information of the scene (e.g., obtained from database 120).

In procedure 256, 3D image data relating to the external scene is received. Referring to FIG. 1, processor 112 receives 3D image data of the external scene, such as real-time images of the scene (e.g., obtained from image sensor 118), and/or previously captured images and/or environmental information of the scene (e.g., obtained from database 120). It is noted that the term "3D image data" encompasses general three-dimensional information relating to a geographic environment, such as terrain elevation or depth (e.g., obtained from a 3D geographic model or digital elevation map), which may not necessarily directly reflect an actual image. The 3D image data may also include textural data relating to geographical terrain features, as well as hierarchical map information, such as embedded maps detailing different portions or sub-regions of a larger map area, or classifications of various geographic features present at a selected location.

In an optional procedure 260, at least one region of interest (ROI) in the scene is selected. Referring to FIG. 2A, buildings 142, 144 and ROI 146 are indicated on 2D image 140. The ROIs may be selected automatically, such as based on predetermined criteria, or may be manually selected by the user, such as using a cursor or designator tool of user interface 116.

In procedure 262, a 2D augmented reality image of the external scene is displayed on the see-through display. It is noted that the 2D image of the external scene may include any portion of a particular scene (i.e., and not necessarily an "entire scene"), such as only selected regions or objects in the scene. Referring to FIG. 1, display 114 displays an augmented reality 2D image generated from the received 2D image data. The 2D image may reflect a designated area or location in relation to platform 100 (e.g., a designated radius). The 2D image may be continuously updated in accordance with the updated position and orientation of display 114 to reflect the changing external scene, such as resulting from the changing location of platform 100. The displayed 2D image may include an indication of at least one ROI in the scene. Referring to FIG. 2A, display 114 displays 2D map image 140 that includes indications of buildings 142, 144 and ROI 146.

In procedure 264, a 3D augmented reality image of the external scene is displayed on the see-through display overlaid conformally onto a view of the scene. It is noted that the 3D image of the external scene may include any portion of a particular scene (i.e., and not necessarily an "entire scene") such as only selected regions or objects in the scene. Referring to FIG. 1, display 114 displays an augmented reality 3D image generated from the received 3D image data. The 3D image depicts the external scene viewed from the perspective of the LOS of display 114. The scene represented by the 3D image at least partially overlaps the scene represented by the 2D image, such that there are at least some common image features in both the 2D image and the 3D image. The 3D image may be continuously updated in accordance with the changing position and orientation of display 114, to reflect the changing perspective of the external scene. Processor 112 may also generate the 3D image in advance based on predefined information, such as the location and movement of platform 100 or a region of interest for the user, such as in accordance with a selected radius surrounding the current location of platform 100 (corresponding to the updated position and orientation of display 114), or a heading (directional) vector or motion trajectory of platform 100 (or display 114).

The displayed 3D image may include an indication of at least one ROI in the scene. Referring to FIG. 2B, display 114 displays 3D map image 150 including indications of buildings 152, 154 and ROI 156.

In procedure 266, a gradual transition of the 2D image into the 3D image is displayed on the see-through display. Referring to FIG. 1, display 114 displays a gradual transition of the 2D image into the 3D image. Display 114 displays at least one intermediate image frame depicting image features of the 2D image in a transitionary state (e.g., having a different size, shape, position, or other visual attributes) as the two-dimensional representation of the external scene is gradually altered into a three-dimensional form. The transition is implemented in a manner that allows visual tracking of transitioning image features. The transition rate or duration of transitioning may be selectively modified. The image transition may be initiated upon manual instructions or automatically upon predetermined conditions. Referring to FIGS. 2A and 2B, display 114 displays 2D map image 140 gradually transitioning into 3D map image 150. The ROI indications are maintained during the image transitioning, where for example, ROI 146 on 2D map image 140 is gradually altered into corresponding ROI 156 on 3D map image 150. Other features of 2D map image 140 may also gradually alter to attain a perspective three-dimensional appearance in 3D map image 150, providing a perspective view of the environment and facilitating identification of the depicted features. For example, the user can track ROIs 142, 144 gradually transitioning into respective ROIs 152, 154, providing enhanced comprehension of the exact locations of buildings 152, 154 in relation to the actual physical environment. It is noted that the gradual transition into a 3D image may also encompass a three-dimensional view of the external scene as viewed through the see-through display 114, i.e., rather than a separate "image", such that the displayed 2D image gradually transitions into a 3D view of the external scene (from the perspective of the viewer).

In procedure 268, a gradual transition of the 3D image into the 2D image is displayed on the see-through display. Referring to FIG. 1, display 114 displays a gradual transition of the 3D image into the 2D image. Display 114 displays at least one intermediate image frame depicting image features of the 3D image in a transitionary state (e.g., having a different size, shape, position, or other visual attributes) as the three-dimensional representation of the external scene is gradually altered into a two-dimensional form. The transition is implemented in a manner that allows visual tracking of transitioning image features. The transition rate or duration of transitioning may be selectively modified. The image transition may be initiated upon manual instructions or automatically upon predetermined conditions. Referring to FIGS. 2A and 2B, display 114 displays 3D map image 150 gradually transitioning into corresponding 2D map image 140. The indications of respective buildings 152, 154 and ROI 156 of 3D image 150 are gradually altered into indications of respective buildings 142, 144 and ROI 146 in 2D image 140. Other image features may also be gradually altered from a perspective three-dimensional appearance of 3D image 150 into a non-perspective two-dimensional appearance in 2D image 140. The 2D image may depict environmental features that are not visible or obstructed from view in the 3D image, allowing the user to clearly perceive such obstructed features and their attributes and location in relation to the actual physical environment.

The method of FIG. 5 is generally implemented in an iterative manner, such that at least some of the procedures are performed repeatedly, in order to maintain the display of a 2D image or a 3D image or a gradual transition between the 2D image and 3D image, of an external scene reflecting the location of the system or platform over a sequence of image frames (i.e., such that the displayed images are linked to the changing location of the platform for at least a selected duration).

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A system for enhancing the situational awareness of a user, the system comprising:
    a movable see-through display viewable by the user, and configured to display a synthetic image while providing a see-through view of a real-world external scene through the display; and
    a processor, configured to receive: (i) an updated position and orientation of the see-through display; (ii) two-dimensional (2D) image data relating to the external scene; and (iii) three-dimensional (3D) image data relating to the external scene,
    wherein the see-through display is configured to display an augmented reality 2D image of the real-world external scene based on the received 2D image data, in accordance with the updated position and orientation of the see-through display, while providing a see-through view of the real-world external scene, the 2D image gradually transitioning into an augmented reality 3D image of the external scene based on the received 3D image data, the 3D image overlaid conformally onto the see-through view of the real-world external scene viewed by the user through the see-through display, in accordance with the updated position and orientation of the see-through display; and
    wherein the see-through display is further configured to display an augmented reality 3D image of the external scene based on the received 3D image data, the 3D image overlaid conformally onto the see-through view of the real-world external scene viewed by the user through the see-through display, in accordance with the updated position and orientation of the see-through display, the 3D image gradually transitioning into an augmented reality 2D image of the real-world external scene based on the received 2D image data, in accordance with the updated position and orientation of the see-through display, while maintaining a see-through view of the real-world external scene.

2. The system of claim 1, wherein at least one of the 2D image and the 3D image comprises at least one region of interest (ROI) selected from the group consisting of:
    an ROI selected based on the updated position and orientation of the see-through display; and
    an ROI selected by the user.

3. The system of claim 1, wherein the 3D image depicts at least one region of interest (ROI) obstructed by features in the external scene.

4. The system of claim 1, wherein at least one image feature of at least one of the 2D image and the 3D image gradually disappears during the gradual transition.

5. The system of claim 1, wherein at least one image feature of at least one of the 2D image and the 3D image gradually appears during the gradual transition.

6. The system of claim 1, wherein the display is further configured to display supplementary image content during the gradual transition.

7. The system of claim 1, wherein at least one transitioning attribute of the gradual transition is selectively modified.

8. The system of claim 1, wherein the see-through display is configured to repeatedly update the gradual transition in accordance with the updated position and orientation of the see-through display.

9. The system of claim 1, wherein the 3D image is generated in advance based on at least one factor selected from the group consisting of:
    a radius surrounding the updated position and orientation of the see-through display;
    a heading vector of the see-through display;
    a selected region of interest (ROI); and
    predefined information.

10. The system of claim 1, wherein the movable see-through display comprises a display of a moving platform.

11. The system of claim 10, wherein the moving platform comprises an aircraft in flight.

12. A method for enhancing the situational awareness of a user, the method comprising the procedures of:
    receiving an updated position and orientation of a movable see-through display viewable by the user, and configured to display a synthetic image while providing a see-through view of a real-world external scene through the display;
    receiving 2D image data relating to the external scene;
    receiving 3D image data relating to the external scene;
    displaying on the see-through display an augmented reality 2D image of the real-world external scene based on the received 2D image data, in accordance with the updated position and orientation of the see-through display, while providing a see-through view of the real-world external scene, the 2D image gradually transitioning into an augmented reality 3D image of the external scene based on the received 3D image data, the 3D image overlaid conformally onto the see-through view of the real-world external scene viewed by the user through the see-through display, in accordance with the updated position and orientation of the see-through display; and
    displaying on the see-through display an augmented reality 3D image of the external scene based on the received 3D image data, the 3D image overlaid conformally onto the see-through view of the real-world external scene viewed by the user through the see-through display, in accordance with the updated position and orientation of the see-through display, the 3D image gradually transitioning into an augmented reality 2D image of the real-world external scene based on the received 2D image data, in accordance with the updated position and orientation of the see-through display, while maintaining a see-through view of the real-world external scene.

13. The method of claim 12, wherein at least one of the 2D image and the 3D image comprises at least one region of interest (ROI) selected from the group consisting of:
- an ROI selected based on the updated position and orientation of the see-through display; and
- an ROI selected by the user.

14. The method of claim 12, wherein the 3D image depicts at least one region of interest (ROI) obstructed by features in the external scene.

15. The method of claim 12, wherein at least one image feature of at least one of the 2D image and the 3D image gradually disappears during the gradual transition.

16. The method of claim 12, wherein at least one image feature of at least one of the 2D image and the 3D image gradually appears during the gradual transition.

17. The method of claim 12, wherein at least one transitioning attribute of the gradual transition is selectively modified.

18. The method of claim 12, wherein the gradual transition is repeatedly updated in accordance with the updated position and orientation of the see-through display.

19. The method of claim 12, wherein the 3D image is generated in advance based on at least one factor selected from the group consisting of:
- a radius surrounding the updated position and orientation of the see-through display;
- a heading vector of the see-through display;
- a selected region of interest (ROI); and
- predefined information.

* * * * *